(12) United States Patent
Otosaka

(10) Patent No.: US 8,702,105 B2
(45) Date of Patent: Apr. 22, 2014

(54) SEAL MEMBER

(75) Inventor: Tetsuya Otosaka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 394 days.

(21) Appl. No.: 12/706,549

(22) Filed: Feb. 16, 2010

(65) Prior Publication Data

US 2010/0207333 A1     Aug. 19, 2010

(30) Foreign Application Priority Data

Feb. 17, 2009 (JP) .................................. 2009-034062

(51) Int. Cl.
 *F16J 15/44* (2006.01)
(52) U.S. Cl.
 USPC ........................................................ 277/355
(58) Field of Classification Search
 USPC ........................................................ 277/355
 See application file for complete search history.

(56) References Cited

U.S. PATENT DOCUMENTS

| | | | | |
|---|---|---|---|---|
| 3,011,766 A * | 12/1961 | Hess | .................................. | 165/9 |
| 4,477,274 A | 10/1984 | Janssen et al. | | |
| 5,794,938 A * | 8/1998 | Hofner et al. | .................. | 277/355 |
| 5,987,879 A * | 11/1999 | Ono | .................. | 60/800 |
| 6,644,667 B2 * | 11/2003 | Grondahl | ...................... | 277/355 |
| 6,869,082 B2 * | 3/2005 | Parker | ........................... | 277/630 |
| 7,578,509 B2 * | 8/2009 | Grondahl | ...................... | 277/355 |

| | | | |
|---|---|---|---|
| 2002/0092328 A1 | 7/2002 | Pedrido et al. | |
| 2004/0089025 A1 | 5/2004 | Kuwahara et al. | |
| 2006/0280578 A1* | 12/2006 | Shiono | ........................... 411/542 |
| 2007/0283722 A1 | 12/2007 | Pathak et al. | |
| 2009/0025431 A1 | 1/2009 | Otosaka | |

FOREIGN PATENT DOCUMENTS

| | | |
|---|---|---|
| CN | 101353224 A | 1/2009 |
| DE | 40 06 839 A1 | 9/1991 |
| EP | 1 112 978 A1 | 7/2001 |
| JP | S60-032339 U | 3/1985 |
| JP | S62-051148 U | 3/1987 |
| JP | H01-183434 | 7/1989 |
| JP | H01-286941 A | 11/1989 |
| JP | 2005-8452 A | 1/2005 |

(Continued)

OTHER PUBLICATIONS

Japanese Office Action dated Jun. 9, 2011, in a counterpart Japanese patent application No. 2009-034062.

(Continued)

*Primary Examiner* — Vishal Patel

(57) ABSTRACT

Provided is a seal member, which is used in a heating furnace having an insertion port to which an end of a rod to be heated is inserted and seals between the insertion port and a surface of the rod inserted to the insertion port in an airtight manner, the seal member having: a plurality of seal chips in thin strips arranged along an inner surface of the insertion port in an airtight manner, each seal chip having one end held by the inner surface of the insertion port and the other end elongated towards inside the insertion port, where (a) when the rod is not inserted in the insertion port, each of the plurality of seal chips forms a slanting angle with respect to an insertion direction of the rod and (b) when the rod is inserted in the insertion port, the other end of each of the plurality of seal chips is pressed against a surface of the rod by means of elastic deformation.

11 Claims, 16 Drawing Sheets

(56) References Cited

FOREIGN PATENT DOCUMENTS

| | | | | |
|---|---|---|---|---|
| JP | 2006248842 | A | * | 9/2006 |
| JP | 2006-342030 | A | | 12/2006 |
| JP | 2007-70189 | A | | 3/2007 |
| JP | 2009-046386 | A | | 3/2009 |

OTHER PUBLICATIONS

European Search Report dated Mar. 20, 2012, in a counterpart European patent application No. 10001595.7.
Office action issued by the State Intellectual Property Office of the People's Republic of China for application No. 201010129397.6.

* cited by examiner

SEAL MEMBER

BACKGROUND

1. Technical Field

The present invention relates to a seal member for a heating furnace. The present application claims priority from a Japanese Patent Application No. 2009-34062 filed on Feb. 17, 2009, the contents of which are incorporated herein by reference.

2. Related Art

An optical fiber is formed by suspending a quartz glass rod called an optical fiber perform rod (hereinafter simply referred to as "preform") in a heating furnace to melt one end thereof, and drawing it. This process is referred to as "drawing." The temperature of the heating furnace during the drawing process reaches around 2000 degrees centigrade. The heater is made of carbon, which is oxidized in the oxygen including atmosphere of a high temperature, and so an atmosphere having inert gasses such as Ar and He is maintained inside the heater.

In the drawing process, one end of the preform is suspended in the inert gas atmosphere, while the other end thereof is placed outside the heating furnace. So as to maintain the inert gas atmosphere, it is required to seal between the wall of the furnace and the surface of the optical fiber preform in an airtight manner. However, the manufacturing process of the optical fiber preform includes a sintering process such as VAD and OVD, which tends to cause different balances in longitudinal direction between the gravity exerted on a softened/melted section and the constriction force on a porous glass to be sintered, and this often causes the resulting optical fiber preforms to have outer diameter variations in the longitudinal direction.

Patent Document No. 1 describes a method of controlling the sintering condition by monitoring an amount of expansion/contraction of a preform when sintered. However, this method necessitates adjusting the outer diameter of the core of the preform in the longitudinal direction in advance, taking into consideration the expansion and contraction thereof. In addition, in applying soot around the core rod, this method requires adjusting the amount of soot to correspond to the core rod diameter in the longitudinal direction, which involves substantial man-hours.

Furthermore, even when the drawing process is performed after elongating, into a thin diameter, a perform with an adjusted outer diameter after depositing soot and sintering it, large variation still tends to be caused in the resulting outer diameter of the preform, especially at the start and the end of the elongated preform. Such portions of the preform cannot be subjected to the subsequent drawing process, and so should be discarded. Therefore, it is required to provide a method for effectively sealing the space between a heating furnace and a preform, even for processing preforms having different outer diameters from each other.

Patent Document No. 2 describes a seal ring which is a combination of an inner seal ring and an outer seal ring, each of which is made of a plurality of parts constituting a ring. This seal ring is pressed against the surface of the preform by means of a return spring outside of the outer seal ring.

However, according to this structure, the ring-constituting parts and their peripheral parts should be processed very accurately, so that each outer ring-constituting part operate evenly according to the outer diameter adjustment. Moreover, the ring-constituting parts of the ring should have a certain height to cooperate each other when moving.

When providing the seal rings in many layers to improve airtightness, the weight of the seal rings will be considerable. In the drawing process, the preform is moved in the horizontal direction, so as to adjust the optical fiber to the center of the diameter measuring apparatus. In such a drawing process, when the preform is heavy, the seal ring does not follow smoothly, and the amount and direction of the movement of it becomes difficult.

Patent Document No. 3 discloses a sealing method using a doughnut-shaped brush made of carbon optical fiber. This method enables to obtain a very stable, favorable, and lightweight seal which does not necessitating such an accurate process as described above. However, a drawback is that the carbon optical fiber, which makes up the brush, occasionally fell off, to be adhered to the surface of the preform to reduce the strength of the optical fiber.

Patent Document No. 4 relates to a seal member which the inventors of the present application have proposed previously. The seal member is made of a heat resistant elastic member, and is made by laminating center-hollow disks, each of which has a plurality of incisions radially from the central aperture. The seal member is provided at the top of the heating furnace, specifically at the port for the preform to come in. This seal member has such a structure that, in lowering a rod, the inner surface of the doughnut-shaped disk structure makes a smooth curve towards the insertion direction of the rod to move along the surface of the rod, thereby favorably sealing the gas inside the heating furnace.

However, in raising the rod, the inner edge of this seal member is occasionally stuck on the rod surface, to leave a space on the surface of the rod. In addition, sometimes this seal member is bent. If the seal member is bent, the sealed state of the gas in the furnace may change to accordingly change the flow of the gas in the furnace. Moreover, sometimes this seal is broken, to let the outer air come in the heating furnace.

The following lists the patent documents used in this specification.

Patent Document No. 1: Japanese Patent Application Publication No. 2005-8452
Patent Document No. 2: Japanese Patent Application Publication No. 2006-342030
Patent Document No. 3: Japanese Patent Application Publication No. 2007-70189
Patent Document No. 4: Japanese Patent Application No. 2007-191694

SUMMARY

Therefore, it is an object of an aspect of the innovations herein to seal an inert gas atmosphere in a heating furnace, regardless of the diameter fluctuation of a preform, which are capable of overcoming the above drawbacks accompanying the related art.

So as to solve the above-stated problem, according to a first aspect related to the innovations herein, provided is a seal member, which is used in a heating furnace having an insertion port to which an end of a rod to be heated is inserted and seals between the insertion port and a surface of the rod inserted to the insertion port in an airtight manner, the seal member having: a plurality of seal chips in thin strips arranged along an inner surface of the insertion port in an airtight manner, each seal chip having one end held by the inner surface of the insertion port and the other end elongated towards inside the insertion port, where (a) when the rod is not inserted in the insertion port, each of the plurality of seal chips forms a slanting angle with respect to an insertion direction of the rod and (b) when the rod is inserted in the insertion port, the other end of each of the plurality of seal chips is pressed against a surface of the rod by means of elastic deformation.

When the above-stated heating-furnace seal member is used, a favorable seal state is obtained, to stabilize inside the heating furnace. When the seal member is used for the drawing furnace for an optical fiber, optical fiber having very small diameter variations can be obtained. It also contributes to prevention of breakage during the drawing process and breakage in proof-testing of the dawn fiber.

DESCRIPTION OF EXEMPLARY EMBODIMENTS

Figure 1:
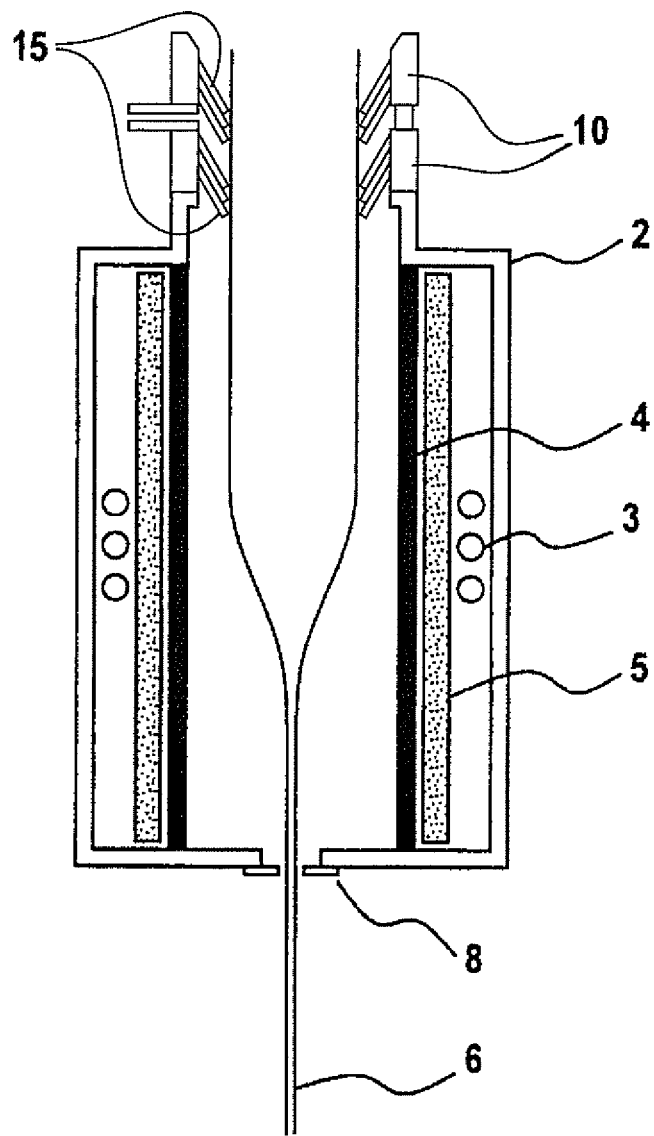
FIG. 1 is a schematic sectional view of a structure of a heating furnace 2.

FIG. 1 is a schematic sectional view of a structure of a heating furnace 2. The heating furnace 2 includes a coil 3, a furnace core tube 4, a heat insulator 5, an iris 8, a holding member 10, and a seal chip 15. The furnace core tube 4 and the heat insulator 5 are coaxially provided around the central axis of the heating furnace 2. The coil 3 is provided around the furnace core tube 4, with the heat insulator 5 therebetween. When a high frequency current is applied to the coil 3, the furnace core tube 4 made of carbon for example is heated by induction heating.

The preform 1 is inserted to the furnace core tube 4, and is heated by radiation heat from the heated furnace core tube 4. The heated preform 1 eventually melts, to suspend downward as an optical fiber 6. The suspending optical fiber 6 is coated with resin by means of a resin coating apparatus not shown in the drawings, and is wound by a bobbin by means of a winding apparatus also not shown in the drawings.

Then iris 8 is provided at the lower end of the heating furnace 2. The iris 8 seals between the surface of the preform 1 and the inner surface of the heating furnace 2, in a substantially airtight manner.

The seal chip 15 held by the holding member 10 is provided at the upper end of the heating furnace 2. The seal chip 15 seals between the surface of the preform 1 and the inner surface of the heating furnace 2, in a substantially airtight manner.

Figure 2:
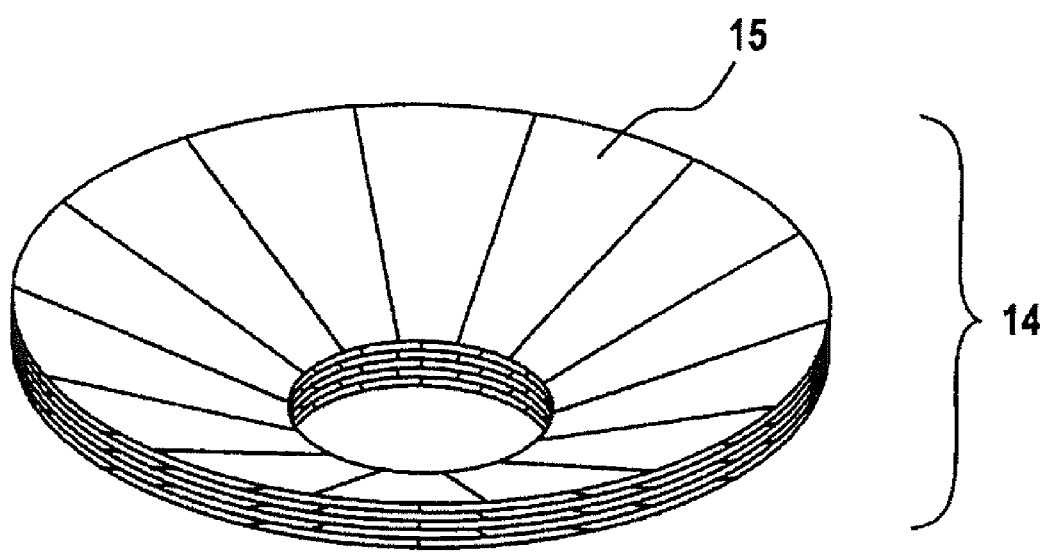
FIG. 2 is a perspective view of a heating-furnace seal member of the present invention.

FIG. 2 is a perspective view of a seal chip laminate 14 of the seal chip 15 attached to the heating furnace 2. As shown, the seal chip 15 is provided to surround the rod inserted to the rod insertion port in the upper part of the heating furnace 2.

The seal chip laminate 14 is made by laminating, in layers, curved surfaces shaped as truncated cone side surfaces, each curved surface being made by arranging a plurality of seal chips 15 and being arranged at an angle not orthogonal to the rod insertion axis. The boundary between adjacent seal chips in a layer is preferably arranged not to overlap with the boundary between seal chips on the upper and lower adjacent layers. By doing so, gas leak from the seal member surface can be restrained to a minimum level.

Here, the seal chips 15, made of heat resistant elastic foil, are arranged at an angle not to be orthogonal to the rod insertion axis, and also not to create a space between each of the seal chips 15. By making the plurality of seal chips 15 to have a curved surface shaped as a truncated cone side surface, there will be no space between it and the preform 1. When the preform 1 is inserted to the seal chip laminate 14 in this state, the area around the tip of the seal chip 15 makes a curve along the side surface of the rod, to obtain stable and favorable sealing.

So as to prevent creation of a space in the boundary between seal chips 15 adjacent to each other in the circumferential direction of the seal chip laminate 14, it is preferable to arrange the curved surface shaped as a truncated cone side surface and made up of the plurality of seal chips, so that the boundary between each adjacent seal chips in one layer to be displaced in position from the boundary between each adjacent seal chips in the upper and lower adjacent layers.

Figure 3:
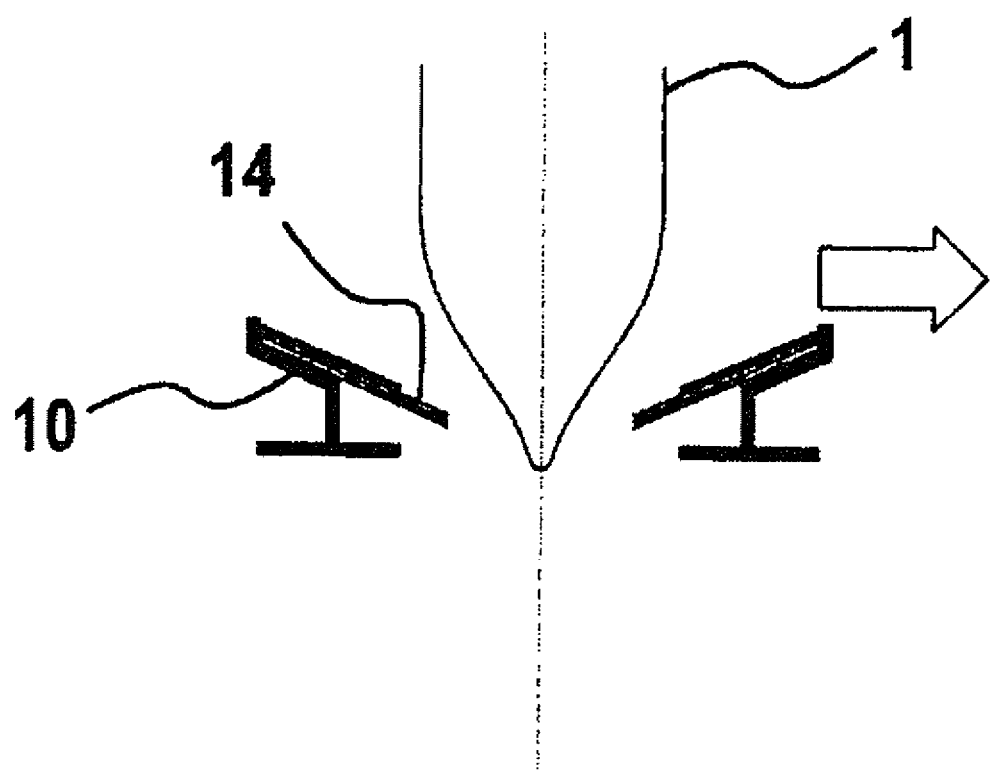
FIG. 3 is a sectional view for explaining the contact state with a rod of a seal chip laminate.
Figure 4:
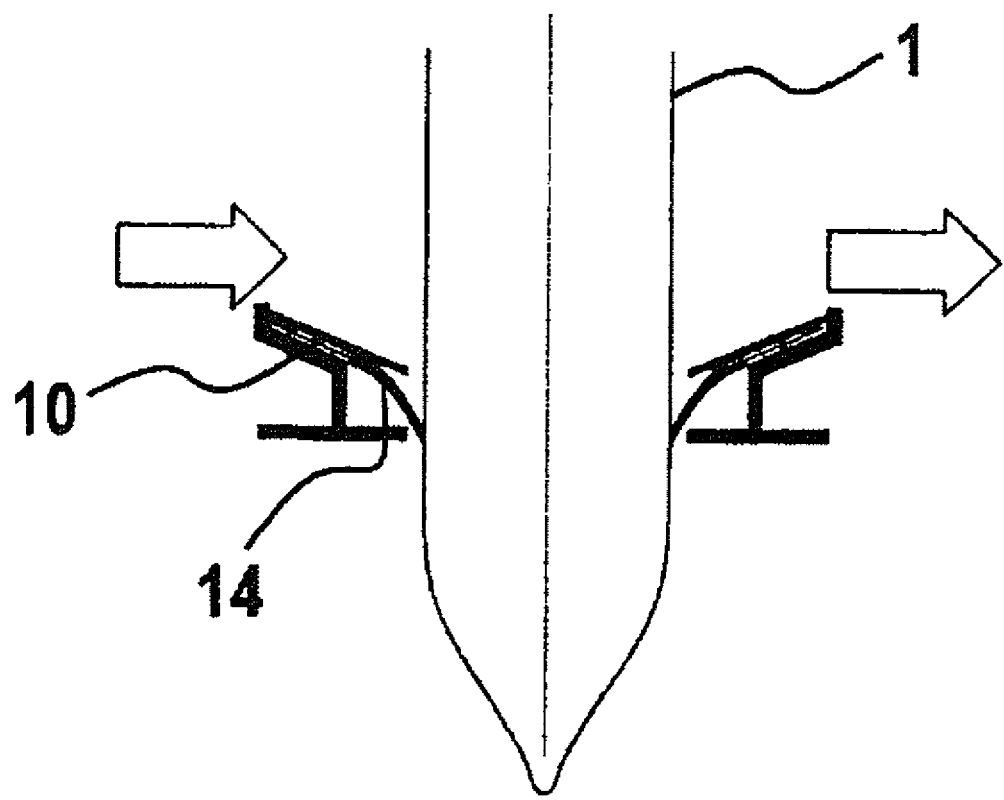
FIG. 4 is a sectional view for explaining the contact state with a rod of a seal chip laminate.
Figure 5:
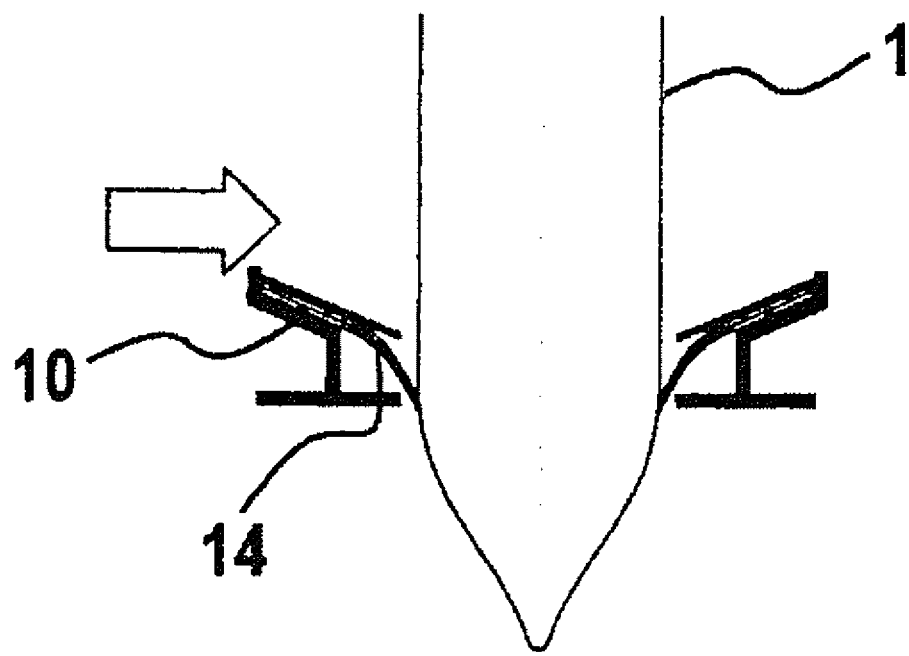
FIG. 5 is a sectional view for explaining the contact state with a rod of a seal chip laminate.

FIG. 3, FIG. 4, and FIG. 5 show how the seal chip laminate 14 operate when inserting the preform 1 and raising the rod. The seal chip laminate 14 is held by the holding member 10, and the preform (rod) 1 is inserted to the central aperture.

When lowering the preform 1, the inner surface of the seal chip laminate 14 is pressed to expand by the tip of the preform 1, as shown in FIG. 3 through FIG. 4, to be curved in the insertion direction. Accordingly, the rod surface will be in contact at the top of the seal chip laminate 14, and not at the inner surface of the seal chip laminate 14. This helps favorably seal the gas in the heating furnace.

When raising the preform 1, since the upper surface of the seal chip laminate 14 is in contact with the surface of the preform 1, the seal chip laminate 14 is easily slide with respect to the preform 1 in the raising operation, as shown in FIG. 4 through FIG. 5. This helps the preform 1 smoothly go up without bending the seal chip laminate 14.

Figure 6:
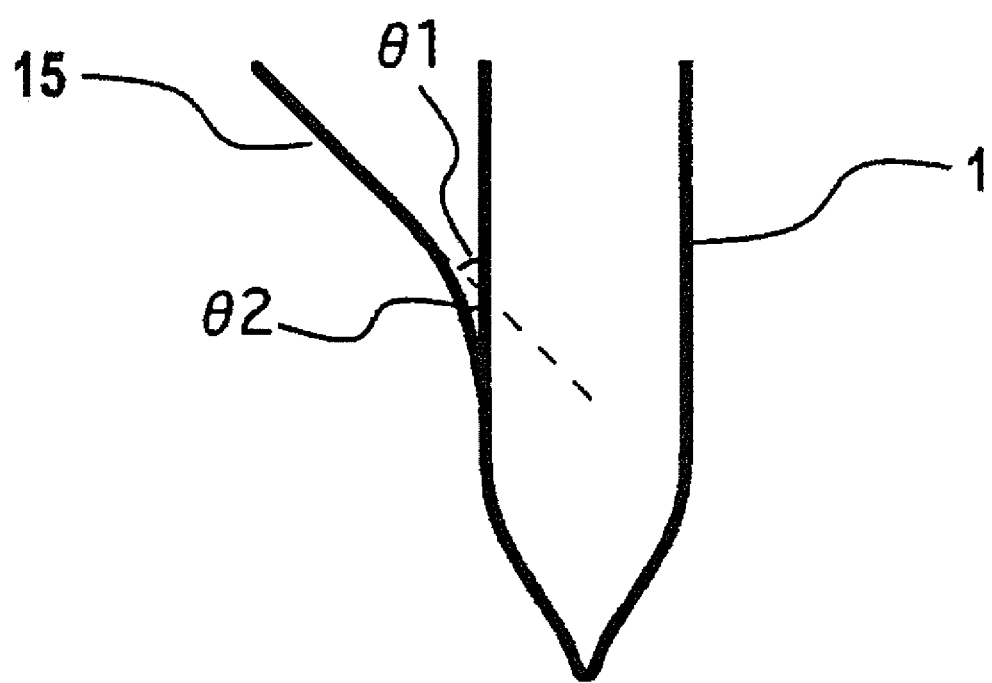
FIG. 6 schematically shows a seal chip orientation angle $\theta 1$ and a seal chip contact angle $\theta 2$.

Next, the inventors have considered the range of angles of the preform 1 during the raising operation in which the rod of the preform 1 gets stuck at the tip of the seal chip. Specifically, as in FIG. 6, the seal chip 15 provided has an angle with respect to the rod insertion axis. Then, the angle (i.e. orientation angle $\theta 1$) formed between the seal chip surface and the rod insertion axis and the angle (contact angle $\theta 2$) formed by the tip of the seal chip 15 which is curved by being in contact with the preform (rod) 1 were measured, and tests were conducted to see if there is any occurrence of the rod being stuck in the raising operation.

The preforms 1 used in the tests are (1) a preform after sintered in VAD, and (2) a fire polished version of the preform of (1) in oxyhydrogen flame. The seal chips used in the tests are (a) tantlum foil having 60 mm (length)×35 mm (width)× 0.05 mm (thickness), and (b) a graphite sheet having 60 mm (length)×35 mm (width)×0.1 mm (thickness).

In the raising operation, if the contact angle $\theta 2$ has exceeded a certain value, there is an occurrence of the seal chip tip being stuck, to cause the seal chip tip to raise and roll up. In view of this, the inventors have measured the maximum seal chip contact angle $\theta 2$ which causes the seal chip tip to be stuck by at least 1 mm with respect to the orientation angle $\theta 1$ of the seal chip, while raising the rod. The measurement result is shown in FIG. 7, FIG. 8, FIG. 9, and FIG. 10.

Figure 7:
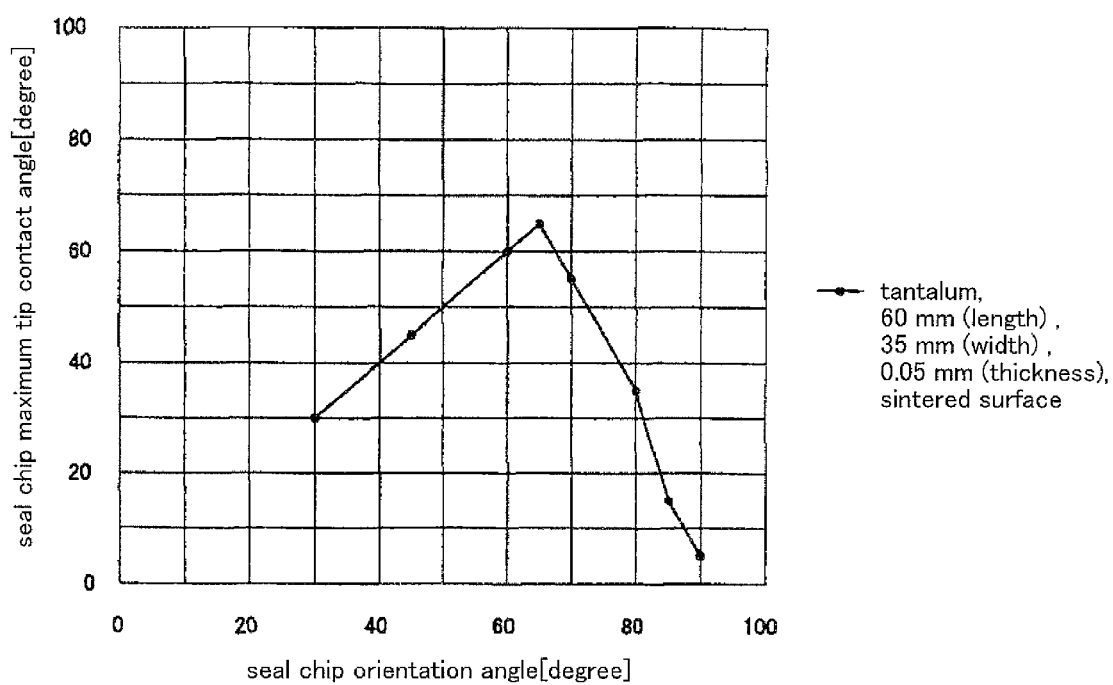
FIG. 7 is a graph showing a relation between a seal chip orientation angle $\theta 1$ and a seal chip maximum tip contact angle $\theta 2$.
Figure 8:
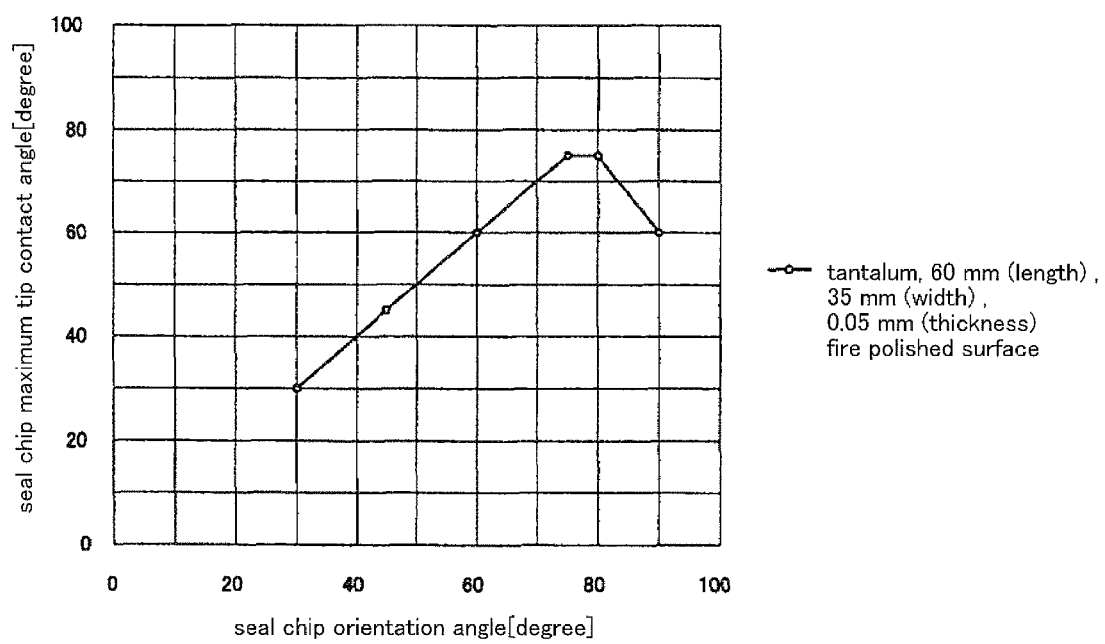
FIG. 8 is a graph showing the relation between a seal chip orientation angle $\theta 1$ and a seal chip maximum tip contact angle $\theta 2$.
Figure 9:
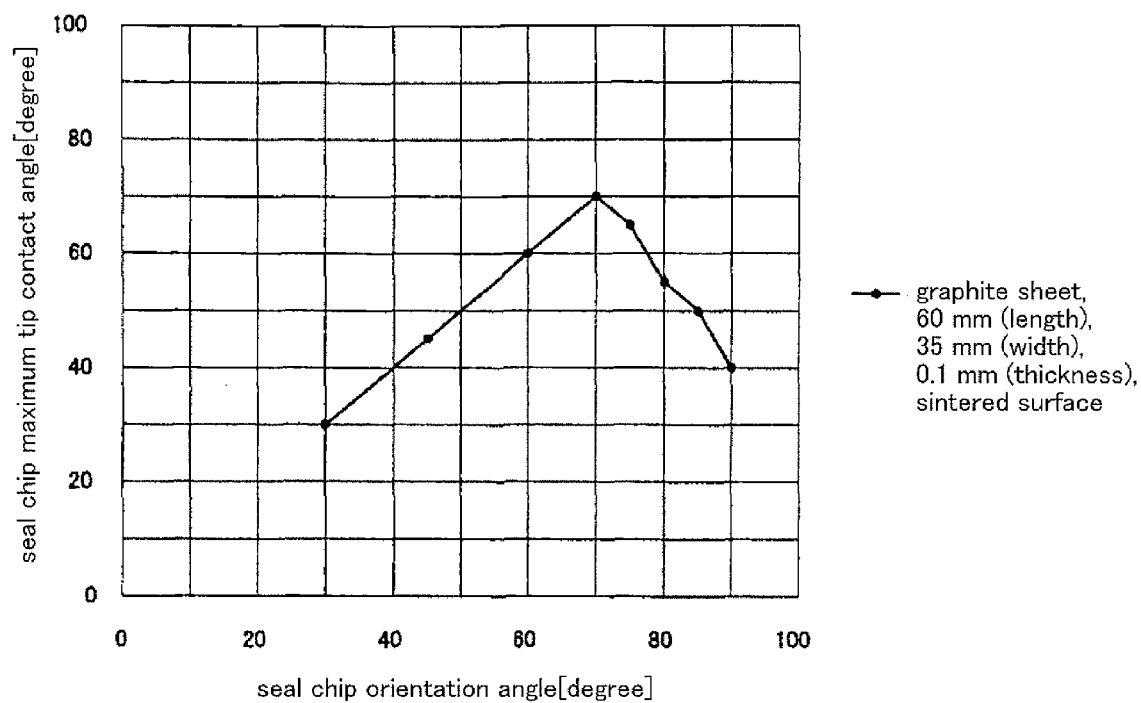
FIG. 9 is a graph showing the relation between a seal chip orientation angle $\theta 1$ and a seal chip maximum tip contact angle $\theta 2$.
Figure 10:
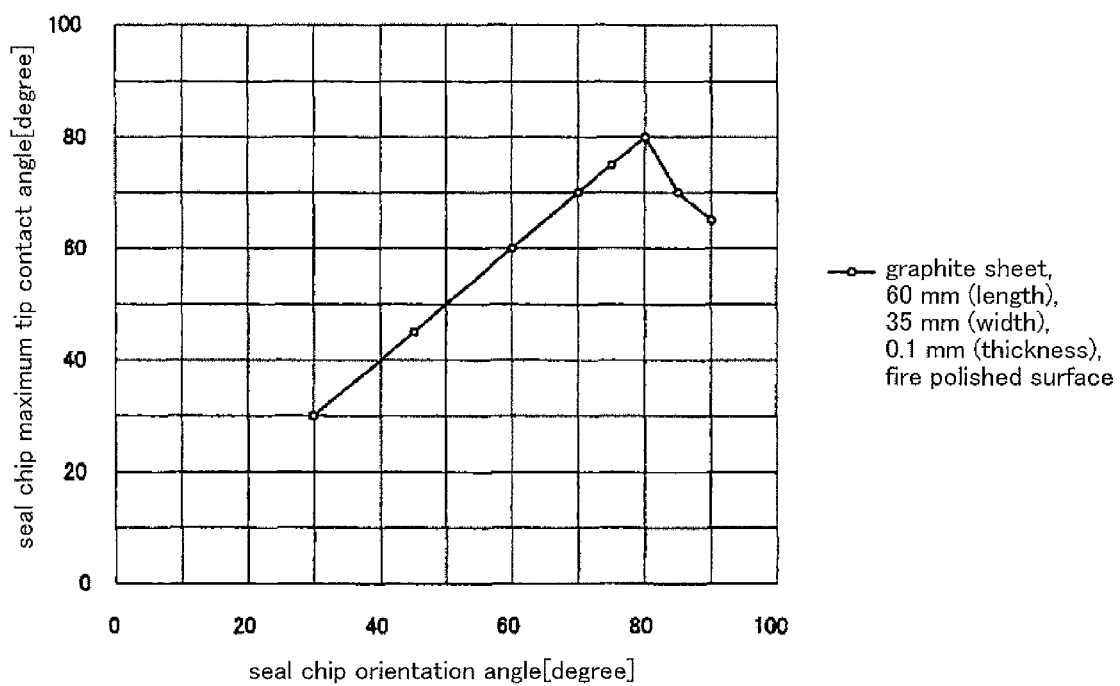
FIG. 10 is a graph showing the relation between a seal chip orientation angle $\theta 1$ and a seal chip maximum tip contact angle $\theta 2$.

The longitudinal axis represents a maximum tip contact angle (contact angle $\theta 2$) which does not cause the seal chip tip to got stuck in the raising operation, and the lateral axis represents a seal chip orientation angle (orientation angle $\theta 1$). FIG. 7 is a measurement result of a combination of sintered preform (rod) and tantalum foil (seal chip), FIG. 8 involves a combination of a fire polished preform and tantalum foil, FIG. 9 involves a combination of a sintered preform and a graphite sheet, and FIG. 10 involves a combination of a fire polished preform and a graphite sheet.

A raise of the seal chip due to the seal chip being stuck is found at the portions off from the relation $\theta 1 = \theta 2$. Comparing FIG. 7 and FIG. 8, or FIG. 9 and FIG. 10, the sintered rod tends to cause the seal chip to get stuck more than in the case of the fire polished rod. Comparing FIG. 7 and FIG. 9, or FIG. 8 and FIG. 10, the tantalum seal chip tends to got stuck more than the graphite seal chip. From FIG. 7 which involves a sintered preform and a tantalum seal chip, it is found that the orientation angle $\theta 1$ equal to or smaller than 60 degrees will prevent occurrence of the seal chip being stuck.

As a result, it is found preferable to set the angle between the seal chip and the rod insertion axis to be equal to or smaller than 60 degrees. If a rod is inserted in this state, the tip of the seal chip will curved along the side surface of the rod, to obtain stable and favorable sealing. On the contrary, if the mentioned angle exceeds 60 degrees, the tip of the seal chip is found to occasionally bent or rolls up, and the stable and favorable sealing cannot be obtained.

Note that the seal chip laminate 14 includes a plurality of seal chips 15 arranged as a truncated cone side surface shape, and laminated, as shown in FIG. 2. When a preform 1 is inserted to a central aperture of this seal chip laminate 14, the seal chip is curved to expand, thereby generating a space between seal chips adjacent in the same plane. Furthermore, if the boundaries between adjacent seal chips 15 are arranged to overlap between the upper and lower layers, thus generated space will penetrate the seal chip laminate, to allows a person to look through the inside of the furnace from outside.

So as to prevent this phenomenon, it is preferable to arrange the seal chips 15 to prevent the seal chip laminate 14 from having any space elongating in the vertical direction of the surface of the seal chips 15. In other words, it is preferable to arrange the seal chips so that the boundary between each seal chips in one layer will not overlap with the corresponding boundary in upper and lower adjacent layers. More concretely, if the boundaries in upper and lower adjacent layers are arranged to match the respective centers of the seal chips of the layer, the highest sealing performance can be achieved.

As mentioned above with reference to FIG. 7, FIG. 8, FIG. 9, and FIG. 10, a seal chip 15 made of graphite is preferable over the metal (tantalum) seal chip 15, in that the preform 1 in the raising operation tends not to be stuck. However, when the graphite has a small crystal grain such as a CC composite or an expanded graphite sheet, dust tends to arise from the tip or the side surface during long usage, which tends to cause a problem by being attached to rod surfaces. Moreover, the seal chips 15 made of a CC composite or an expanded graphite sheet are very fragile and easy to break, if subjected to a vacuum cleaner to eliminate dust or the like from between the seal chips 15.

Therefore, in addition to heat resistance, the seal chips 15 are required to have tenacity under high temperatures, so as not to hurt the rod in raising and lowering operations of the preform 1, as well as not to cause any space with the rod. Some examples of such a material are tantalum, a nickel alloy (e.g. INCONEL 601 manufactured by Daido-Special Metals Ltd.), and a stainless alloy (e.g. SUS310). If such a material is used, corrosion of the members due to oxidization as well as occurrences of dust therefrom are restrained, to pursue favorable manufacturing.

Alternatively, the seal chip 15 may be made from a high orientation thermal decomposition graphite sheet from which dust rarely arises (e.g. PGS graphite sheet manufactured by Panasonic Corporation). The high orientation thermal decomposition graphite sheet is hard to break even in the event of being bent, and from which dust rarely arises from the bent portion, and so has an advantage in reliability and durability over the expanded graphite sheet or the CC composite, and also cleaning of attached dust is easier for the high orientation thermal decomposition graphite sheet than for the expanded graphite sheet or the CC composite.

Note that a configuration is also possible in which two layers of seal chip laminates 14 are provided in a vertical direction with a space therebetween, so that an inert gas flows in the space. In this configuration, since it is an atmosphere free from oxygen, the lower layer of seal chip laminate closer to the furnace and so subjected to higher temperature can be made of tantalum having low oxidation resistance but having excellent heat resistance, while making the higher layer of seal chip laminate to be exposed to air by a alloy such as INCONEL 601 or SUS 310 having excellent oxidation resistance in high temperatures. The high orientation thermal decomposition graphite sheet is usable in upper or lower laminte.

Production Example 1

As a sample (a), a seal chip laminate 14 is produced made of 5 layers of truncated cone side surface shaped surfaces, each of which is made of 39 tantalum foil seal chips having a length of 60 mm, a width of a tip of about 8.7 mm, and a thickness of 0.05 mm arranged to form an angle of 46.2 with respect to the rod insertion axis. This seal chip laminate 14 has the structure explained in FIG. 2, and has a rod insertion aperture having an inner diameter of 108 mm.

This sample (a) is arranged so that the boundary between seal chips 15 in one layer does not overlap the boundary between seal chips 15 in the upper and lower layers. The seal chips 15 are fixed at their peripheries by the holding member 10 made of quartz glass.

As a sample (b), a seal chip laminate 14 is produced made of 5 layers of truncated cone side surface shaped surfaces, each of which is made of 39 INCONEL 601 seal chips having a length of 60 mm, a width of a tip of about 8.7 mm, and a thickness of 0.05 mm arranged to form an angle of 46.2 with respect to the rod insertion axis. This seal chip laminate 14 has the structure explained in FIG. 2, and has a rod insertion aperture having an inner diameter of 108 mm.

In this sample (b), too, the boundary between seal chips 15 in one layer does not overlap the boundary between seal chips 15 in the upper and lower layers. The seal chips 15 are fixed at their peripheries by the holding member 10 made of quartz glass.

The sample (a) and the sample (b) are arranged in this order on top of the heating furnace 2 (i.e. so that the sample (a) is on the heating furnace 2), respectively as a seal chip laminate 14. Between the sample (a) and the sample (b), an argon gas is made to flow, to prevent oxidation of the sample (a).

From above the heating furnace 2, a preform 1 is inserted and the drawing process is performed while heating it, where the preform 1 has a length of 2000 mm and has a straight body portion, the outer diameter of which varies within the range of 160 mm and 172 mm in the longitudinal direction is inserted. In the drawing process, about a half of the preform 1 is drawn. As a result, the outer diameter fluctuation for the total length of the drawn optical fiber 6 was within the range of ±0.2 μm, and there was no breakage caused during the drawing process.

Further, thus produced optical fiber 6 was subjected to a proof test of 1%×1 second, the average survival length was 552 km, which is favorable. Note that the 1%×1 second proof test was to subject the entire length of the optical fiber 6 to a tensile load to generate 1% stretch for 1 second. If having a weak portion (i.e. low strength portion), the optical fiber subjected to the proof test will break. The length of an unbroken fiber is referred to as a survival length, and the average survival length is an average of the length of all the unbroken fibers.

Embodiment Example 2

The material of the seal chips 15 is changed to a PGS graphite sheet having a thickness of 0.1 mm, and the heat drawing process is performed to the rest of the preform 1. As a result, for the total length of the drawn optical fiber 6, the outer diameter fluctuation was within the range of ±0.2 μm, and there was no breakage caused during the drawing process. Further, thus produced optical fiber was subjected to a proof test of 1%×1 second, the average survival length was 601 km, which is favorable.

Comparison Example 1

Figure 11:
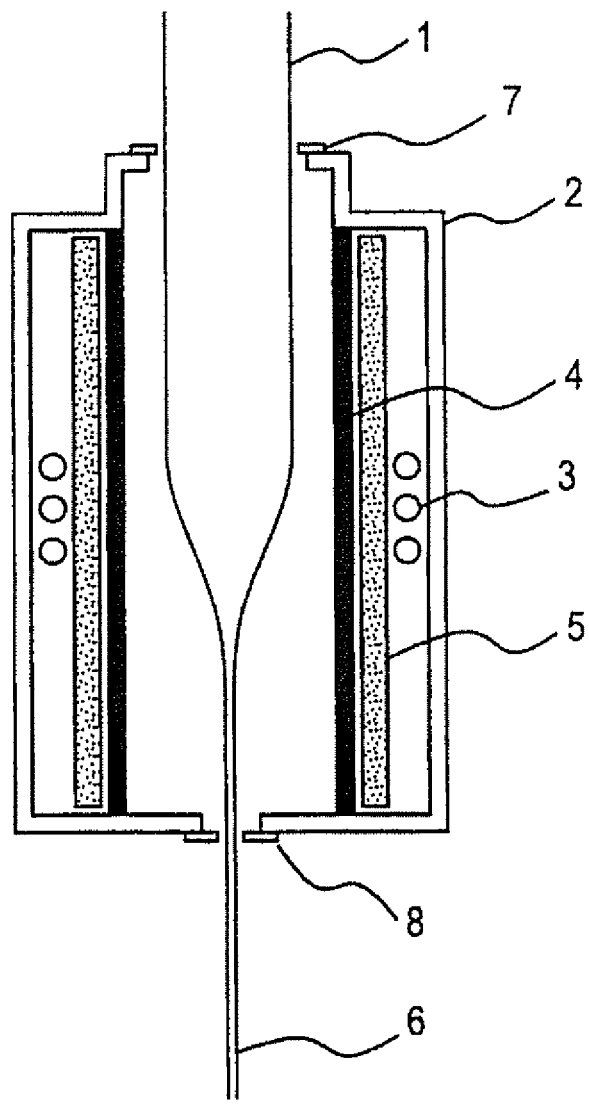
FIG. 11 is a schematic longitudinal-sectional view for explaining another drawing method.

FIG. 11 is a schematic sectional view of a heating furnace 2 having another structure. This heating furnace 2 has the same structure as the heating furnace 2 of FIG. 1, except the following. The common elements are assigned the common reference numerals, and the corresponding explanation is omitted in the following.

The heating furnace 2 has a unique structure in that it has a disk 7 instead of the holding member 10 and the seal chip 15. The disk 7 is provided on top of the heating furnace 2, and is attached horizontally to make a right angle with respect to the central axis of the preform 1 inserted to the heating furnace 2. In the center of the disk 7, an insertion aperture is formed to have substantially the same inner diameter as the outer diameter of the preform 1, to seal between the heating furnace 2 and the preform 1.

By managing, to be around 125±1 μm, the space between the disk 7 and the preform 1, the inert gas atmosphere in the heating furnace 2 can be maintained. However, if there is a fluctuation in the diameter of the preform 1, it allows communication between the inside and the outside of the heating furnace 2, to let air in the heating furnace 2. If this occurs, not only it inhibits the outer diameter control of the optical fiber 6, but also the carbon members such as the furnace core tube 4 in high temperature conditions are corroded, to shorten the life of these members. Furthermore, when dust arises from the corroded portion to adhere to the melted portion of the preform 1, a local diameter fluctuation, strength reduction, or the like will be caused to the optical fiber.

Comparison Example 2

Figure 12:
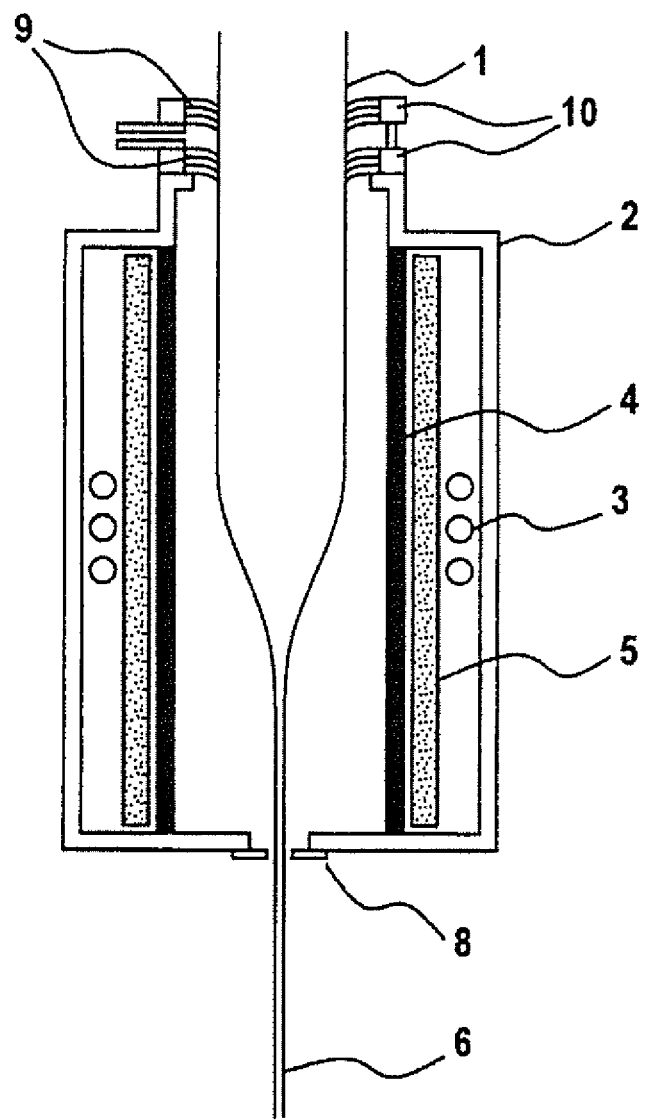
FIG. 12 is a schematic longitudinal-sectional view for explaining another sealing method.

FIG. 12 is a schematic sectional view of a heating furnace 2 having a still different structure. This heating furnace 2 has the same structure as the heating furnace 2 of FIG. 1, except the following. The common elements are assigned the common reference numerals, and the corresponding explanation is omitted in the following. The heating furnace 2 has a unique structure in that the holding member 10 supports a horizontal doughnut-shaped disk laminate 9, instead of the seal chips 15.

Figure 13:
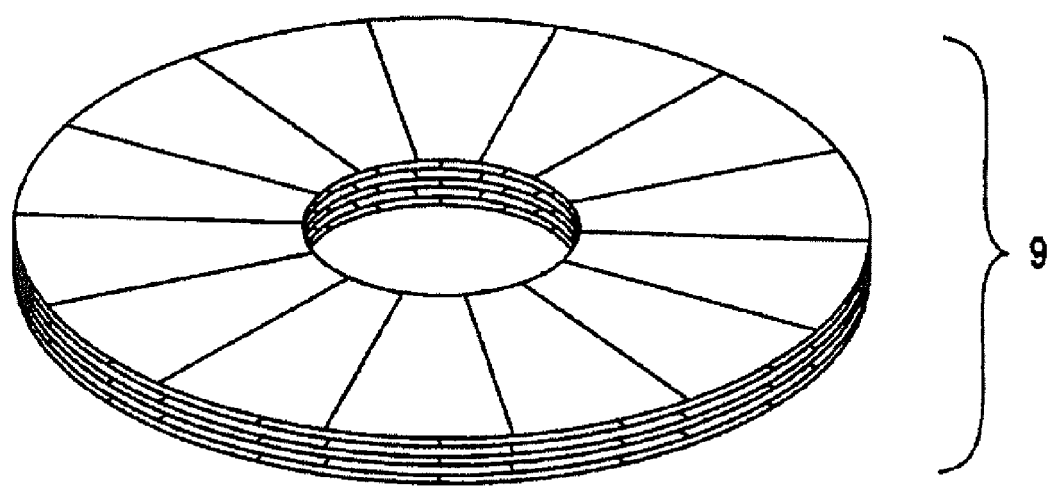
FIG. 13 is a perspective view of another seal member.

FIG. 13 is a perspective view of a single doughnut-shaped disk laminate 9 mounted to the heating furnace 2. As shown, the doughtnut-shaped disk laminate 9 is made of a heat resistant elastic member, and is made by laminating center-hollow disks, each having a plurality of incisions radially from the central aperture. The inner edge of the central aperture of the doughnut-shaped disk laminate 9 is curved to be in contact with the preform 1. When the preform 1 was drawn the stated heating furnace 2, favorable sealing was obtained in lowering the preform 1 with respect to the heating furnace 2. However, there occasionally found deterioration or breakage in sealing when raising the preform 1.

Figure 14:
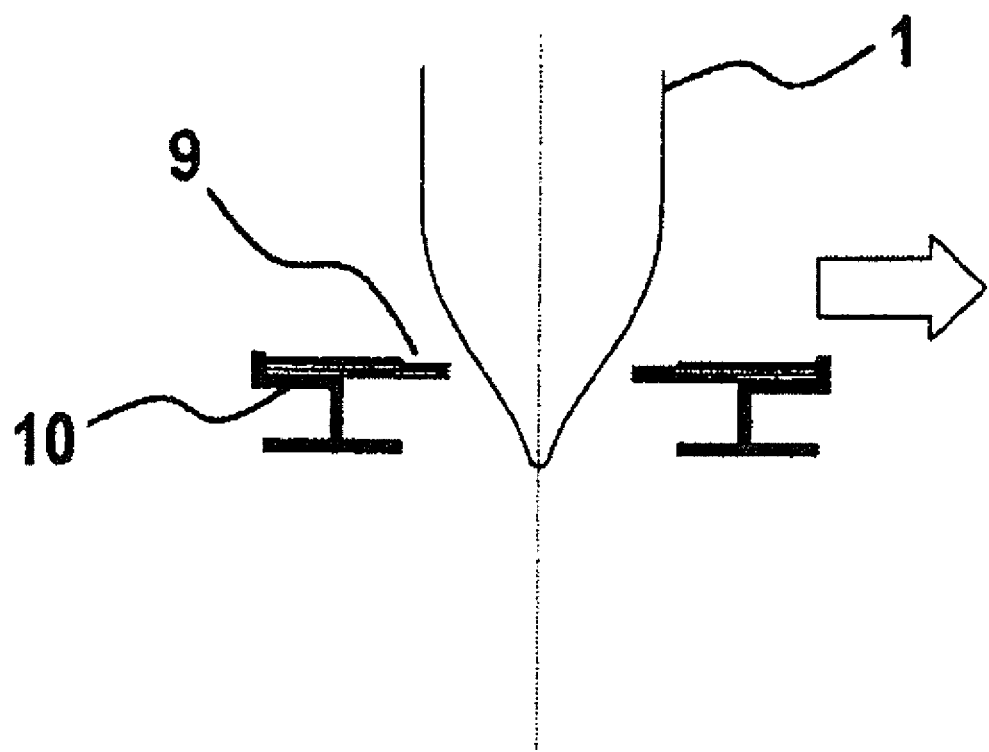
FIG. 14 is a schematic longitudinal-sectional view showing the contact state with a rod of a doughnut-shaped disk laminate.
Figure 15:
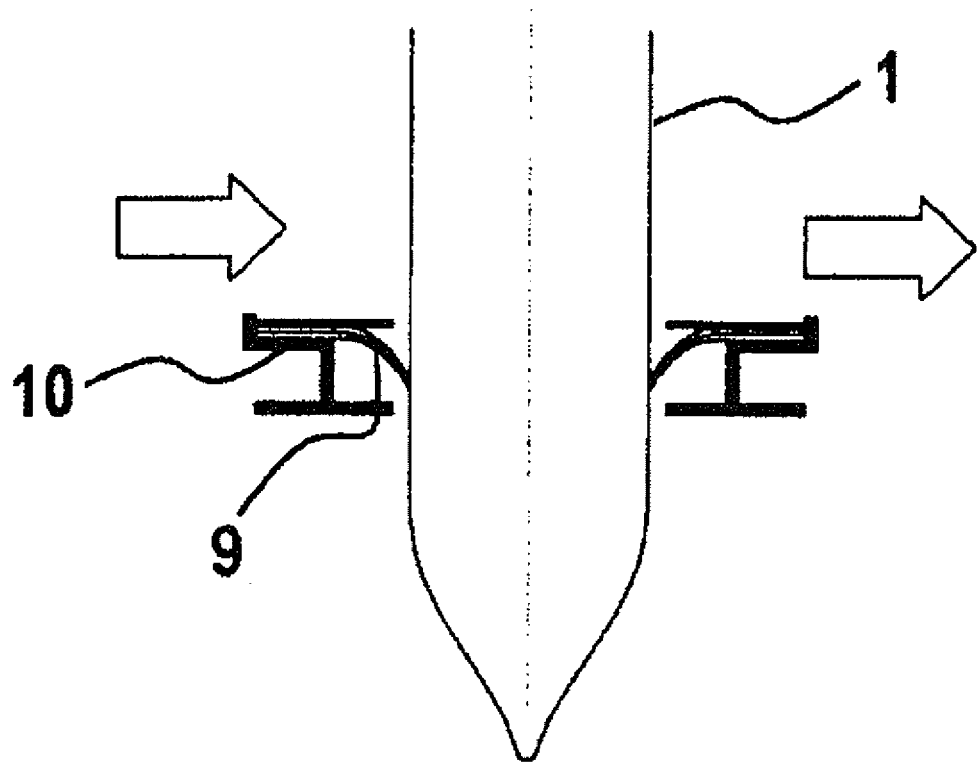
FIG. 15 is a schematic sectional view showing the contact state with the rod of a doughnut-shaped disk laminate.
Figure 16:
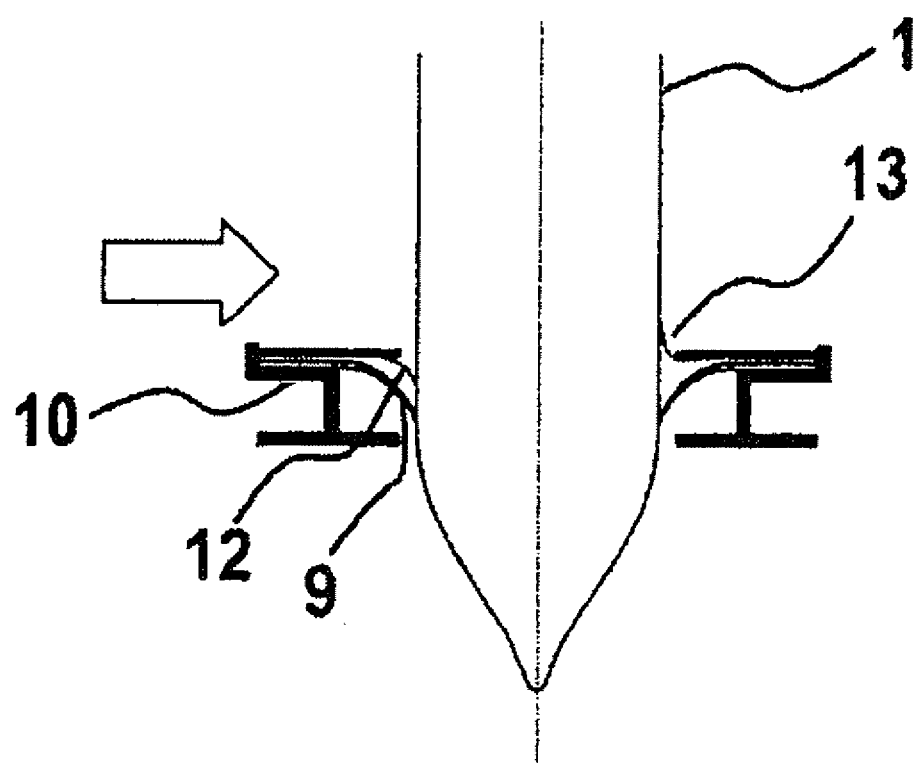
FIG. 16 is a schematic sectional view showing the contact state with the rod of a doughnut-shaped disk laminate.

FIG. 14, FIG. 15, and FIG. 16 show the state of the doughnut-shaped disk laminate 9 when inserting or raising the preform 1. As shown in FIG. 14 through FIG. 15, the inner surface of the doughnut-shaped disk laminate 9 will be smoothly curved towards the insertion direction of the preform to be along the rod surface, which allows the gas in the heating furnace 2 to be favorably sealed.

However, in raising the preform 1, the inner edge of part of the doughnut-shaped disks was stuck at the rod surface to form a space 12, as shown in FIG. 15 through FIG. 16. The space 12 sometimes returns abruptly to the original position in the elapse of time, to change the gas seal condition and the gas flow in the furnace.

In addition, there occasionally found cases where an upper bent portion 13 was formed for the doughnut-shaped disk laminate 9. Also, there was a case where the entire holding member 10 was raised, to let outer air into the heating furnace 2. If the bent portion 13 is formed, a part of a doughnut disk should be exchanged.

When a graphite doughnut-shaped disk laminate 9 is used, the self lubricating characteristic of the graphite prevents the disk from being stuck. On the other hand, if graphite having comparatively fine crystal grains is used, the dust generation of the dust itself becomes problematic, and dust tends to be emitted from the edge surface of the graphite.

Furthermore, there found cases where the dust entered between doughnut-shaped disks adhered to the preform, to degrade the strength of the optical fiber. Further, since the doughnut-shaped disk laminate made of graphite is fragile, blowing of compressed air or cleaning using a vacuum suction becomes difficult, which is particularly problematic in long-term usage.

What is claimed is:

1. A seal member, which is used in a heating furnace having an insertion port to which an end of a rod to be heated is inserted along an insertion axis of the insertion port and seals between the insertion port and a surface of an inserted rod in a substantially airtight manner, the seal member comprising:

a plurality of seal chips arranged annularly along an inner surface of the insertion port in a substantially airtight manner, each seal chip having a first curved end held by the inner surface of the insertion port at an angle not orthogonal to the insertion axis, a second curved end elongated towards the insertion axis, and inclined sides connecting the first and second curved ends so that the second curved ends of the plurality of seal chips form a continuous inner surface facing the insertion axis, the second end of each of the plurality of seal chips adapted to press against the surface of the inserted rod and curve away from the insertion axis by means of elastic deformation, the plurality of seal chips are arranged as a curved surface shaped as a truncated cone side surface, wherein the angle is 60 degrees or smaller.

2. The seal member according to claim 1, wherein
the plurality of seal chips make up a plurality of mutually laminated layers including a first layer and a second layer adjacent to the first layer, and
a boundary between adjacent seal chips in the first layer is displaced, in a circumferential direction of the insertion port, from a boundary between adjacent seal chips in the second layer.

3. The seal member according to claim 2, wherein
the plurality of mutually laminated layers are arranged such that the boundary between adjacent seal chips in the first layer retains the displaced state in the circumferential direction of the insertion port with respect to the boundary between adjacent seal chips in the second layer when the second end of each of the plurality of seal chips is pressed against the surface of the inserted rod.

4. The seal member according to claim 2, wherein
the plurality of seal chips make up a plurality of mutually laminated layers including a first layer and a second layer adjacent to the first layer, and
a space, in which an inert gas flows, is provided between the first layer and the second layer.

5. The seal member according to claim 1, wherein
the plurality of seal chips include a high orientation thermal decomposition graphite.

6. The seal member according to claim 1, wherein
the plurality of seal chips include tantalum, a nickel alloy or a stainless alloy.

7. A heating furnace comprising the seal member according to any of claims 1-6.

8. The seal member according to claim 5, wherein
the plurality of seal chips further include a heat resistant metal.

9. The seal member according to claim 6, wherein the plurality of seal chips include tantalum.

10. A seal member, which is used in a heating furnace having an insertion port to which an end of a rod to be heated is inserted along an insertion axis of the insertion port and seals between the insertion port and a surface of an inserted rod in a substantially airtight manner, the seal member comprising:

a plurality of seal chips arranged annularly along an inner surface of the insertion port in a substantially airtight manner, each seal chip having a first curved end held by the inner surface of the insertion port at an angle not orthogonal to the insertion axis, a second curved end elongated towards the insertion axis, and inclined sides connecting the first and second curved ends, the second end of each of the plurality of seal chips adapted to press against the surface of the inserted rod and curve away from the insertion axis by means of elastic deformation, the plurality of seal chips are arranged as a curved surface shaped as a truncated cone side surface, wherein the angle is 60 degrees or smaller.

11. A seal assembly, which is used in a heating furnace having an insertion port to which an end of a rod to be heated is inserted along an insertion axis of the insertion port and seals between the insertion port and a surface of an inserted rod in a substantially airtight manner, the seal assembly comprising: a first seal member; and a second seal member spaced from the first seal member in the direction of the insertion axis, wherein the first seal member and the second seal member each include a plurality of seal chips arranged annularly along an inner surface of the insertion port in a substantially airtight manner, each seal chip having a first end held by the inner surface of the insertion port at an angle not orthogonal to the insertion axis and a second end elongated towards the insertion axis, the second end of each of the plurality of seal chips adapted to press against the surface of the inserted rod and curve away from the insertion axis by means of elastic deformation, the plurality of seal chips of the first seal member include a high orientation thermal decomposition graphite, the plurality of seal chips of the second seal member include a heat resistant metal, the plurality of seal chips are arranged as a curved surface shaped as a truncated cone side surface, and the angle is 60 degrees or smaller.

* * * * *